United States Patent Office.

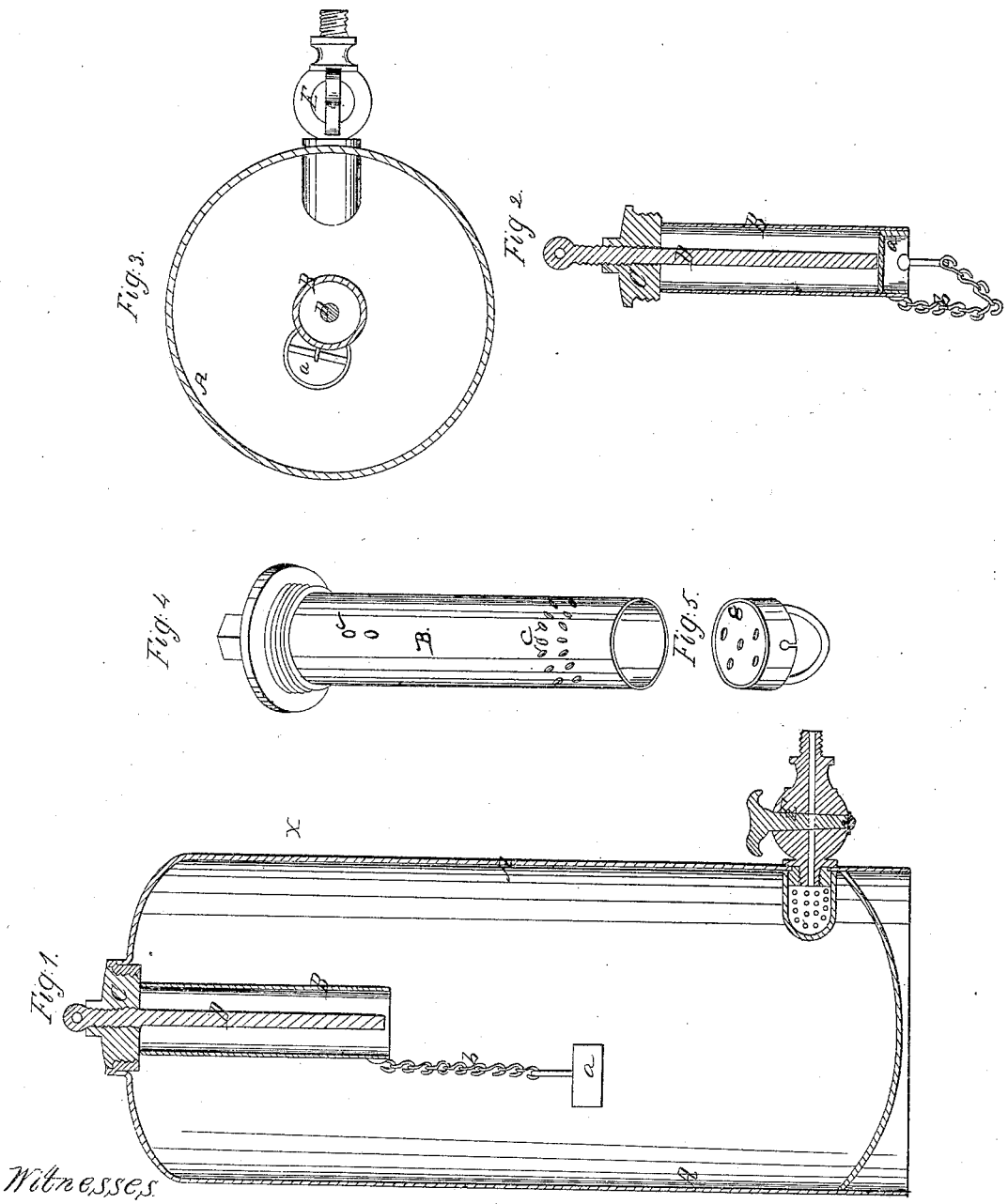

DANIEL NEEDHAM, OF GROTON, MASSACHUSETTS, ASSIGNOR TO HIMSELF, JESSE A. LOCKE, AND C. M. HOVEY.

*Letters Patent No. 65,500, dated June 4, 1867.*

IMPROVED APPARATUS FOR CHARGING SODA-FOUNTAINS.

*The Schedule referred to in these Letters Patent and making part of the same.*

TO ALL WHOM IT MAY CONCERN:

Be it known that I, DANIEL NEEDHAM, of Groton, in the county of Middlesex, and State of Massachusetts, have invented certain improvements in Apparatus for Charging Soda-Fountains, etc., of which the following is a full, clear, and exact description, reference being had to the accompanying drawings, making part of this specification, in which—

Figure 1 is a central vertical section through a soda-fountain having my improved apparatus applied thereto, the lower end of the tube for containing one of the gas-producing ingredients being represented as open.

Figure 2 is a central vertical section through the tube with its lower end closed.

Figure 3 is a horizontal section on the line $x\ x$ of fig. 1.

Figures 4 and 5 represent a modification of my invention.

The ordinary operation of charging fountains for containing soda or other mineral waters necessitates the transportation of the fountain to the place where the charging apparatus is located, which is frequently at a distance. To avoid the labor and delay thus occasioned, and to afford a means always at hand whereby the fountain may be charged and recharged, is the object of my invention, which consists in placing one of the gas-producing agents within a tube which is screwed or otherwise secured within the casing of the fountain containing the liquid with the other gas-producing ingredient in solution, the tube being either provided with perforations or not, which may be closed or not by a soluble substance, the lower end of the tube being also closed thereby, or the tube may be provided with a plug or valve for closing its bottom, a rod passing through the tube, and being pushed down upon the plug or valve to remove it after the tube has been properly secured within the casing to allow of the mixture of the two ingredients, whereby the carbonic acid gas is generated in a simple and expeditious manner, and at a trifling cost.

To enable others skilled in the art to understand and use my invention, I will now proceed to describe the manner in which I have carried it out.

In the said drawings, A is a cylindrical metallic receptacle or casing, the top and bottom of which is of an arched or other form best adapted to resist any required pressure. Within this receptacle is poured water with one of the ingredients intended to produce carbonic acid gas in solution. B is a tube for containing the other ingredient which is placed therein through its lower end, which is left open for this purpose, after which the bottom of the tube is closed by a plug, $a$, or its equivalent, (fig. 2,) attached thereto by a chain, $b$, or other suitable device. The tube B is secured to a stopper, C, and after being filled is screwed into the top of the casing A, (see fig. 1,) when the two gas-producing ingredients are allowed to unite by removing the plug by the operation of screwing a rod, D, down thereon, (see fig. 1.) Or the rod may carry at its lower end a cork or other suitable material which may be raised and lowered by operating the rod so as to close and open the lower end of the tube as required. A material soluble in water, such as sugar, gelatine, or other suitable substance, may be employed to close the lower end of the tube, if preferred, in which case the rod D would be dispensed with. The tube B and its plug $a$ may be provided with small holes $c$, (see figs. 4 and 5,) by which construction the tube may be securely screwed within the casing before the ingredient within the tube has dissolved enough to generate sufficient gas to create pressure which would prevent this being done. E is a stop-cock of the ordinary construction, by opening which the contents of the receptacle may be drawn off.

Fountains for containing soda and mineral waters and other effervescing beverages, constructed as above described, may be readily and repeatedly filled and charged by any person of ordinary capacity, and the expense and labor of transporting the fountain to a distance thereby avoided.

*Claim.*

What I claim as my invention, and desire to secure by Letters Patent, is—

The tube B, or its equivalent, for containing one of the gas-producing ingredients, operated in the manner substantially as described, in combination with the casing A of a fountain for soda and mineral waters and other effervescing beverages, substantially as set forth.

DANIEL NEEDHAM.

Witnesses:
P. E. TESCHEMACHER,
N. W. STEARNS.